(12) United States Patent
Makineedi et al.

(10) Patent No.: US 11,263,114 B2
(45) Date of Patent: Mar. 1, 2022

(54) METHOD AND TECHNIQUE TO FIND TIMING WINDOW PROBLEMS

(71) Applicant: International Business Machines Corporation, Armonk, NY (US)

(72) Inventors: Sreenivas Makineedi, Round Rock, TX (US); Douglas Griffith, Burnet, TX (US); Emmanuelle Samir Hanna Matta, Cairo (EG); Evelyn Tingmay Yeung, Round Rock, TX (US); Srinivasa Rao Muppala, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/580,687

(22) Filed: Sep. 24, 2019

(65) Prior Publication Data

US 2021/0089428 A1 Mar. 25, 2021

(51) Int. Cl.
*G06F 9/44* (2018.01)
*G06F 11/36* (2006.01)
*G06F 9/48* (2006.01)
*G06F 11/28* (2006.01)

(52) U.S. Cl.
CPC ........ *G06F 11/3632* (2013.01); *G06F 9/4881* (2013.01); *G06F 11/28* (2013.01); *G06F 11/3612* (2013.01)

(58) Field of Classification Search
USPC ........................................................ 717/124
See application file for complete search history.

(56) References Cited

U.S. PATENT DOCUMENTS

| | | | |
|---|---|---|---|
| 6,081,901 A | 6/2000 | Dewa et al. | |
| 7,100,033 B2 | 8/2006 | Roth et al. | |
| 7,174,554 B2 | 2/2007 | Pierce et al. | |
| 7,330,988 B2 | 2/2008 | Golla et al. | |
| 7,356,726 B2 | 4/2008 | Shimoyama et al. | |
| 8,432,181 B2 | 4/2013 | Chiadambaram | |
| 8,453,122 B2 | 5/2013 | Flemming et al. | |
| 2001/0044909 A1* | 11/2001 | Oh | G06F 1/324 713/600 |
| 2009/0044188 A1* | 2/2009 | Kanai | G06F 9/4887 718/100 |
| 2011/0302551 A1* | 12/2011 | Hummel, Jr. | G06F 3/04842 717/105 |

(Continued)

OTHER PUBLICATIONS

Negrean et al., "Response-Time Analysis of Arbitrarily Activated Tasks in Multiprocessor Systems with Shared Resources," Institute of Computer and Communication Network Engineering, Braunschweig, Germany, Dated 2009, 6 pages.

(Continued)

*Primary Examiner* — Anna C Deng
(74) *Attorney, Agent, or Firm* — Alex Harvey (57) ABSTRACT

Threads of a multithreaded application may be scheduled to different cores and executed in various orders and at various frequencies. Controlling how the threads are scheduled and clock rates of processor cores enables testing multiple possible execution scenarios, which may force previously unknown timing window problems to occur. These timing window problems may then be detected.

20 Claims, 7 Drawing Sheets

(56) References Cited

U.S. PATENT DOCUMENTS

| | | | | |
|---|---|---|---|---|
| 2012/0304183 | A1* | 11/2012 | Yamashita | G06F 9/4881 |
| | | | | 718/102 |
| 2014/0006751 | A1 | 1/2014 | Aliseychik et al. | |
| 2014/0019738 | A1* | 1/2014 | Kataoka | G06F 9/3851 |
| | | | | 712/240 |
| 2015/0205636 | A1* | 7/2015 | Kulkarni | G06F 9/4881 |
| | | | | 718/103 |
| 2017/0116039 | A1* | 4/2017 | Mealey | G06F 9/45558 |
| 2018/0210532 | A1* | 7/2018 | Zhang | G06F 9/5094 |
| 2018/0239641 | A1* | 8/2018 | Kumar | G06F 9/5094 |
| 2018/0246802 | A1* | 8/2018 | Cerny | G06F 9/30079 |
| 2018/0300843 | A1* | 10/2018 | Gould | G06T 1/20 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

METHOD AND TECHNIQUE TO FIND TIMING WINDOW PROBLEMS

BACKGROUND

The present disclosure relates to software, and more specifically, to detecting timing window problems in a complex symmetric multiprocessing (SMP) environment.

Multithreaded execution, the practice of executing more than one thread of a program at the same time, may provide a significant boost to execution time for many applications. However, multithreaded execution can also result in timing window problems, sometimes referred to as "race conditions." Timing window problems can occur if an application is written such that unexpected performance (e.g., memory corruption, a crash) may result when two particular threads are executed simultaneously or in a particular order.

In order to take advantage of multithreaded execution, software applications may be divided into a number of threads. These threads typically include one or more instructions to be executed by a core of a central processing unit (CPU). In a typical multithreading scenario, during execution, a "thread scheduler" component of an operating system (OS) may be responsible for assigning threads to CPU cores.

CPUs operate at a particular frequency, or "clock rate," which describes a number of pulses the cores of the CPU can generate every second. This is distinct from processor "speed" or "instructions executed per second," as instructions vary in complexity and thus executing some instructions require more pulses (and therefore time) than others. However, clock rate and execution rate are still related—increasing clock rate generally results in executing instructions more quickly.

SUMMARY

Some embodiments of the present disclosure can be illustrated as a method. The method may comprise determining an arrangement. The arrangement may identify execution speeds for multiple threads. The method may further comprise selecting a central processing unit (CPU) core for at least one of the threads. The selection may be based on a clock rate of the CPU core and an execution speed. The method may further comprise causing the CPU core to execute the thread.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a CPU. The CPU may determine an arrangement. The arrangement may identify execution speeds for multiple threads. The CPU may further select a CPU core for at least one of the threads. The selection may be based on a clock rate of the CPU core and an execution speed. The CPU may further cause the CPU core to execute the thread.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system and method to test for timing window problems in a complex SMP environment. More particular aspects relate to a system to cause threads of an application under test to be scheduled and executed on specific cores of one or more central processing units (CPUs), iterating through various permutations of thread-core mappings to cause existing timing window problems in the application to occur.

Timing window problems may typically be particularly difficult to detect because, depending upon the nature of the problem, they might only occur in exceedingly rare edge cases. Further, these edge cases may appear to a user to simply be ordinary execution. This is because they may be caused solely by a specific pattern of thread executions that may be unlikely to occur in typical usage. For example, a CPU may typically execute a first thread of an application before a second thread but completing the second thread out of order (i.e., before the first thread) may cause an error (unbeknownst to a developer or a user). Since the outcome may depend upon which of the two threads is executed first, this may be referred to as a "race condition." In this situation, the application may appear to function properly for an extended duration (sometimes years) before the error happens to occur. Such an error may only finally first occur when certain conditions that are outside of a user's control or knowledge are met (e.g., the first thread happens to be scheduled on a CPU core whose clock rate is temporarily lower than typical, allowing the second thread to complete earlier for the first time). In these situations, users are often left wondering what caused the error.

These kinds of problems are often accidentally introduced during development of an application. Timing window problems may result in a variety of issues such as errors, abnormal terminations, unexpected results or behavior, etc. Timing window problems may often be corrected by modifying the application to ensure the race condition(s) cannot occur during operation. With reference to the previous example, a developer may modify the application such that the two specific threads cannot be executed simultaneously, such as by preventing execution of one thread until execution of the other thread has completed). As timing window problems may be introduced accidentally and often depend upon chance to occur, the main hurdle to correcting them is often discovering the problems in the first place. Further, even if the problem happens to occur and to be noticed by a developer, reproducing the problem (a common debugging tactic of attempting to force a problem to occur in order to narrow down a specific cause) may also be difficult and dependent on chance.

Of course, some timing window problems may also occur frequently, but these are often quickly detected and debugged. More complex applications with increasingly entangled threading designs can allow for inadvertent introduction of race conditions that are particularly difficult to detect. For example, an application with hundreds of threads, 8 of which may be executed at the same time, might only have a single race condition (for example, the only problem may occur when execution of two specific threads out of the several hundred happens to overlap).

In some applications, many threads must be completed before others can begin. Continuing the previous example, the first thread might be executed at any time, while the second thread might only be able to begin execution after twelve other "precursor" or "parent" threads are completed. This might mean that, in typical instances, the first thread is complete long before the second thread is even started. Thus, it may be extraordinarily unlikely for the second thread to be executed before the first thread. For example, the problem discussed above may occur if the second thread's parent threads happen to be scheduled on particularly quickly cores, and/or if the first thread simply is not executed for an unusually long period of time, allowing the first thread to actually be executed alongside the second thread.

Some timing window problems may depend on more than just order of execution or whether two threads are executed simultaneously; they may further depend on the nature of the threads being executed. In other words, continuing the same example, even if execution of the first thread has some overlap with execution of the second thread, the problem may not be guaranteed to occur. A simplified example of this kind of timing window problem may occur if both threads attempt to read from and write to the same memory location. For example, two threads may both attempt to increment a value stored in a memory location with an initial value of "12." In order to increment this value, a thread may read the value from memory, add one to the value, and write the result "13" back to the same memory location, overwriting whatever was previously stored there (i.e., initially "12"). Ordinarily, the CPU may execute the threads one after another, so the first would read "12," add one, and write the result "13" then the second thread would read "13," add one, and write the result "14." However, if the CPU executes the threads simultaneously, the second thread might read the value before the first has written back its result. This would result in both threads reading and incrementing the value "12," so both threads would write "13" back to the memory address. In this example, any overlap of execution of the two threads will result in an inaccurate result.

As a further complication, in some situations only a very specific overlap of execution of two threads will result in a problem (the "timing window"). To modify the previous example, rather than incrementing the value (X) by one, the two threads are to add a number Y stored in some other memory address to X. In this situation, to compute X'=X+Y, both threads may perform four operations (read Y, read X, compute the result, and write the new value for X'). Some overlap of execution may not result in a problem. For example, either thread may read Y at any time during the execution of the other thread without resulting in a problem, but if both threads read X before either write the result, the problem will occur. Thus, even forcing two threads to execute with partial overlap may not be guaranteed to cause (and thus detect) any timing window problems.

Throughout this disclosure, reference is made to one or more "arrangements." As used herein, "arrangement" and/or "mapping" may refer to a specific setup of threads with respect to execution speeds. Arrangements may dictate a speed at which threads are executed via scheduling the threads to be executed on specific CPU cores operating at known clock rates. For example, an application may include three threads A, B and C. These threads may be scheduled to execute amongst CPU cores 1, 2, and 3. A first arrangement may involve a thread A executing on core 1 at a first clock rate, a thread B executing on core 2 at the same (first) clock rate, and thread C executing on core 3 at a second clock rate. A second arrangement may involve thread A executing on core 3, thread B executing on core 2, and thread C executing on core 1. Thus, threads A and C are executed at different clock rates for each arrangement. If a timing window problem exists in the application, it may be triggered and detected under one arrangement even if it is not triggered under the other arrangement.

"Execution speed," as used herein, refers to a rate at which a thread is executed. Execution speed may be generally correlated to clock rate. Rather than specify clock rates, some arrangements may simply dictate relative execution speeds for some or all of the threads of an application. For example, an arrangement may require that a first thread be executed at 100% execution speed while a second thread is to be executed at 40% execution speed. Thus, if a first core is operating at a clock rate of 2 GHz, the first thread can be executed at that frequency while the second thread must, according to the arrangement, be executed at 40% of 2 GHz (0.8 GHz).

Some arrangements may be "redundant." As used herein, an arrangement is redundant with another arrangement if, under both arrangements, all threads would be executed in the same order and at the same clock rates. As discussed herein, an arrangement may be considered redundant even if the threads are executed on different CPU cores. This may occur, for example, when multiple cores are operating at the same clock rate. Continuing with the previous example, a third arrangement involving thread A executing on core 2, thread B executing on core 1, and thread C executing on core 3 may be redundant and unhelpful, because all threads are executing at the same clock rates as in the first arrangement (because the cores 1 and 2 are operating at the same clock rate). Since any timing problem that would occur under the third arrangement would likely have already been triggered and detected when testing the first arrangement, omitting a test of the third arrangement may improve testing speed without a relevant loss in veracity.

Throughout this disclosure, reference is made to cores being "fast" or "slow," or to multiple cores operating at the "same" clock rate. As used herein, these terms are relative and may vary depending upon use case. For example, in some use cases, even relatively large clock rate deviations (e.g., 1 GHz or greater, 15% or greater) may still provide acceptable problem detection rates and so may be considered redundant. This is because CPU clock rates may have some variability regardless of what they are set to operate at, so enforcing strict equivalence may result in unnecessarily testing effectively redundant arrangements. However, in some use cases, even the slightest clock rate variation may make the difference between a timing window problem occurring (and thus being detected) or remaining undetected. Therefore, in some embodiments wherein exhaustive, definitive determinations are particularly important (e.g., for applications that are to operate in healthcare settings, aerospace settings, etc.), strict equivalence may be enforced to ensure that any possible timing window problem is detected. Thus, in some embodiments even 1 Hz clock rate deviations between arrangements may not be considered "redundant," although since many systems may struggle to maintain clock rates within such a tight tolerance, in some embodiments redundancy checks may simply be omitted rather than spend time and resources comparing clock rates that are nearly certain to be different. Thus, a degree of similarity between two clock rates before they are considered "identical" or "the same" for purposes of redundancy may vary depending upon use case.

In some embodiments, clock rates may be measured relative to a particular maximum clock rate. For example, a maximum clock rate may be set by a manufacturer as 4 GHz. Thus, other clock rates may simply be referred to as "50%," which in this example would be 2 GHz. Some arrangements may determine that each core is set to 100% except for one core which is set to 1%, or all cores could be set to operate at 1% except for one which is at 100%. In some embodiments, each core may be set to a different clock rate. Other combinations are possible and are fully contemplated herein.

Figure 1A:
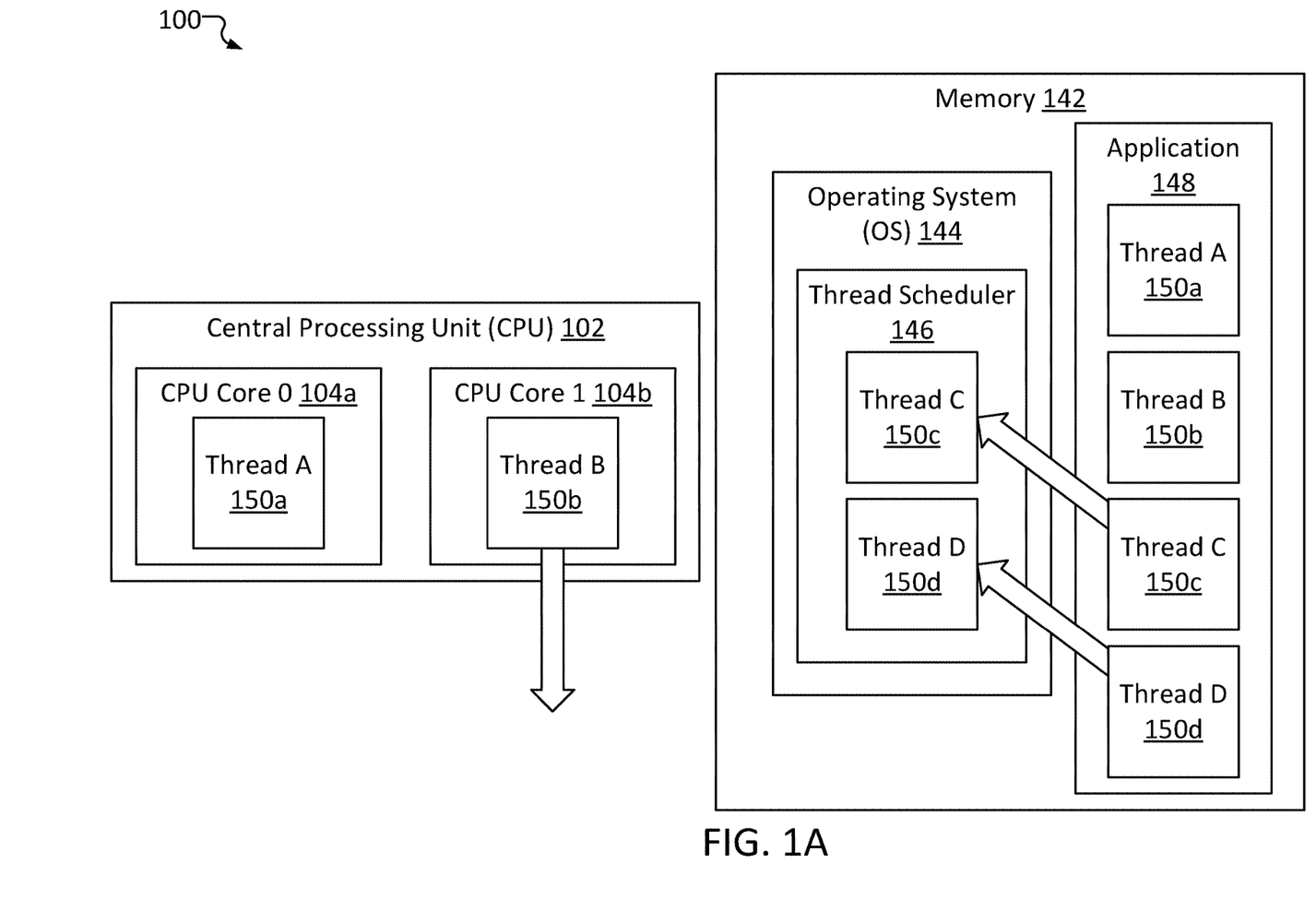
FIG. 1A illustrates a high-level block diagram of a timing-window-problem-detection system according to several embodiments of the present disclosure.

FIG. 1A illustrates a high-level block diagram of a timing-window-problem-detection system 100 according to several embodiments of the present disclosure. System 100 includes a central processing unit (CPU) 102 and memory 142. CPU 102 includes a plurality of cores including at least CPU core 0 104*a*, CPU core 1 104*b*, and optionally additional cores up to a total of n cores (collectively "cores 104"). CPU 102 may also include CPU memory to store CPU microcode (not shown in FIG. 1). The CPU microcode includes stored instructions which control functionality of CPU 102, including a clock rate for each of cores 104. In some embodiments, each of cores 104 may include its own CPU memory and CPU microcode. In some embodiments, the CPU microcode may be modified to enable control of a clock rate for one or more of CPU cores 104.

Memory 142 stores instructions and data for retrieval and execution by CPU 102. Software running on system 100 may be loaded into memory 142, including operating system (OS) 144 and at least one application 148. Application 148 includes two or more threads (collectively "threads 150") such as thread A 150*a*, thread B 150*b*, thread C 150*c*, thread D 150*d*, and optionally so on up to a total of p threads. CPU 102 communicates with memory 142 via a memory bus (not shown in FIG. 1).

CPU cores 104 execute threads 150 as scheduled by thread scheduler 146. As shown in FIG. 1A, in one example CPU core 0 104*a* may be executing thread A 150*a* while CPU core 1 104*b* executes thread B 150*b*. Further, thread scheduler 146 may receive additional threads to schedule for execution, such as thread C 150*c* and thread D 150*d*. If none of cores 104 are available to execute a new thread, scheduler 146 may wait. As shown in FIG. 1A, core 1 104*b* may complete execution of thread B 150*b*, signaling it is ready to execute another thread.

Figure 1B:
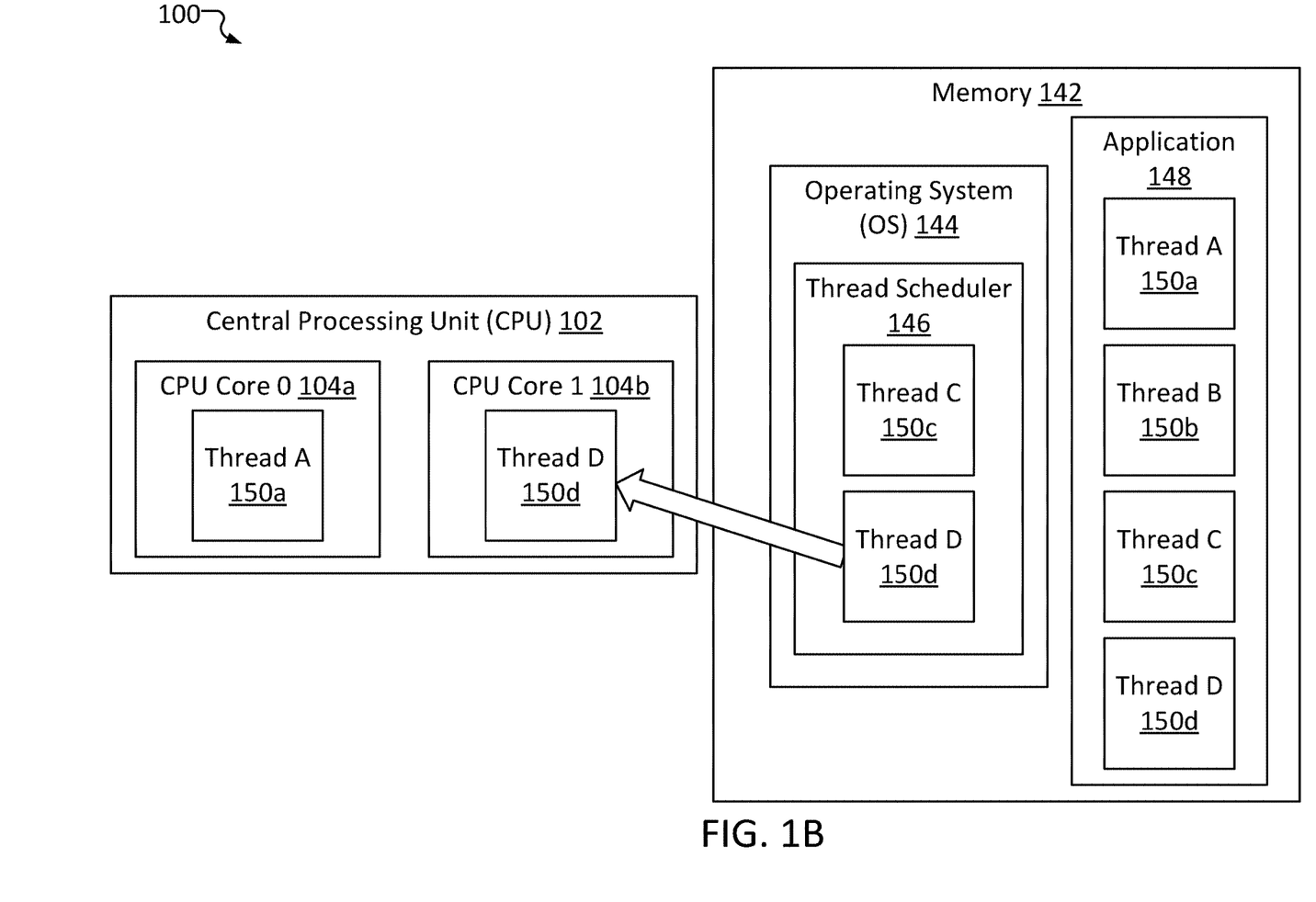
FIG. 1B illustrates a second view of a timing-window-problem-detection system according to several embodiments of the present disclosure.

FIG. 1B illustrates a second view of a timing-window-problem-detection system 100 according to several embodiments of the present disclosure. As shown, scheduler 146 schedules thread D 150*d* to execute on core 1 104*b*. This may be because an arrangement being tested by system 100 dictates that thread D 150*d* should execute before thread C 150*c*. In some embodiments, the arrangement could also specify a desired clock rate that thread C 150*c* must be executed at. If core 1 104*b* is not operating at the desired clock rate, scheduler 146 may wait for another core (e.g., core 0 104*a*) that is operating at the desired clock rate. The arrangement may also specify that thread D 150*d* should be executed on the same core as or immediately after thread B 150*b*, or that thread C 150*c* should not be scheduled for execution until after CPU 102 has completed execution of thread A 150*a* (or even of thread D 150*d*).

In some embodiments, system 100 may further control a clock rate of any or all of cores 104. This may allow further control over which arrangements may be tested. For example, if an arrangement specifies that thread D 150*d* must be executed at a certain clock rate that no core 104 is currently operating at, system 100 may modify a clock rate of one of cores 104 (such as core 1 104*b*) to satisfy the requirements of the arrangement.

Figure 2:
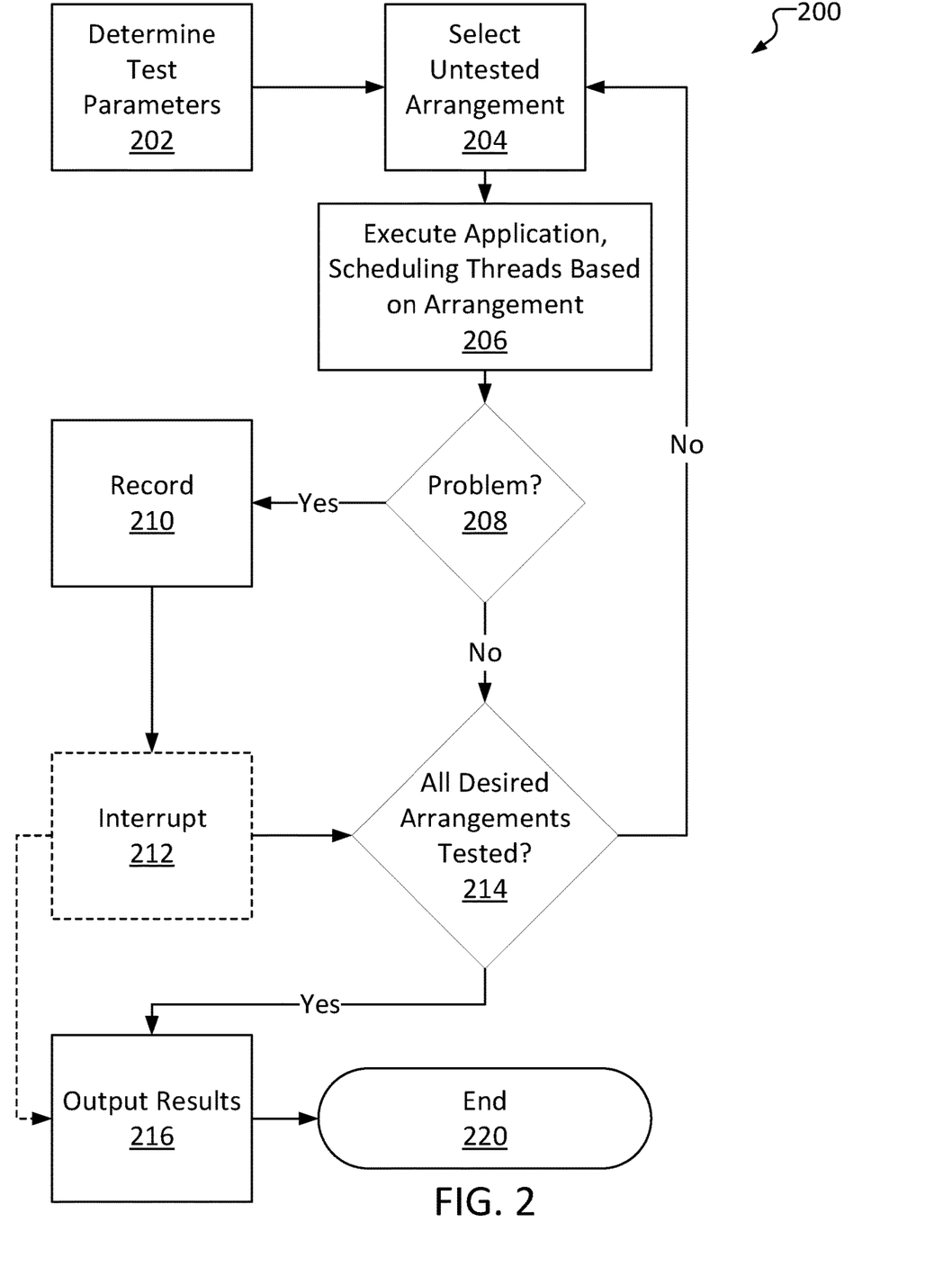
FIG. 2 illustrates a timing-window-problem-detection method according to several embodiments of the present disclosure.

FIG. 2 illustrates a timing-window-problem-detection method 200 according to several embodiments of the present disclosure. Method 200 includes determining test parameters 202. This may include, for example, receiving a set of arrangements to test for a given application. These arrangements may specify, for some or all threads of an application, what frequencies the threads should be executed at, which order the threads should be executed in, and/or which cores the threads should be scheduled to execute on. In some embodiments, system 100 may determine these arrangements automatically, as described with reference to FIG. 3, below. In some embodiments, a user of system 100 may manually determine which arrangements to test, and block 202 may simply comprise receiving those arrangements. In some embodiments, block 202 may include a maximum or minimum number of arrangements to test. In some embodiments, block 202 may include an instruction to test "random" arrangements. A random arrangement may include, for example, assigning threads to random cores, and possibly setting cores to random clock rates. As used herein, the term "random" may refer to true random, pseudorandom, or another similar unpredictable selection regime. In some embodiments, block 202 may include a combination, such as one or more "required" arrangements as well as a maximum or minimum number of "optional" arrangements to test. In some embodiments, "optional" arrangements may be determined randomly, selected from a predetermined list (in a set order or at random) or may be specifically defined.

Method 200 further includes selecting an untested arrangement 204. This may include, for example, selecting one of the arrangements determined (or received) at 202 and comparing the selected arrangement to an array of tested arrangements. The array may be stored in memory, such as in memory 142. Initially, this array may be empty, or may include a list of arrangements determined to not be possible or not desired for testing. As arrangements are tested, they may be copied into the array such that any further iterations of 204 do not result in system 100 selecting an arrangement that has already been tested. In some embodiments, block 204 may include determining an arrangement at random (i.e., assigning threads to random cores, and possibly setting cores to random clock rates). In some embodiments, random arrangements may still be tracked as tested in an array, enabling system 100 to determine whether a new randomly derived arrangement has been previously tested. In other embodiments, random arrangements may not be tracked as tested, reducing a memory footprint of testing system 100 (as the array is unnecessary).

Method 200 further includes executing the application, including scheduling threads based on the selected arrangement 206. This may be performed in part, for example, by a thread scheduler of an operating system (OS) such as thread scheduler 146 included in OS 144. As the application is executed, the thread scheduler will, in scheduling a thread, check the selected arrangement to determine the core on which to schedule the thread. For example, one arrangement may determine that a first thread (e.g., thread A 150a of FIG. 1) should be executed at a slower clock rate than a second thread (e.g., thread B 150b of FIG. 1). In order to determine the core on which to schedule the thread, the thread scheduler may determine (via OS 144) clock rates of CPU cores 104. In some embodiments, OS 144 may be able to control clock rates of CPU cores 104 (this control may be enabled via, for example, modifications to the CPU microcode), which may be necessary or desired depending upon arrangement. For example, if all cores are determined to be executing at the same clock rate, OS 144 may change one core to be slower in order to enable the thread scheduler to schedule the first thread to be executed at a slower clock rate. Thus, depending upon the selected arrangement and the determined clock rates, the thread scheduler may schedule thread A 150a to a first CPU core (e.g., CPU core 1 104b) and schedule thread B 150b to a second CPU core (e.g., CPU core 0 104a). Block 206 may further include recording that the selected arrangement has been tested in, for example, the array checked at 204.

Method 200 further includes determining if a problem occurred 208. This may include, for example, verifying that the application being tested (i.e., application 148 of FIG. 1) is still responding, verifying that the application has completed execution successfully, determining whether the application has returned an error message, determining whether the application or system has terminated abnormally, etc. If a problem has occurred (208 "yes"), the problem is recorded 210. This may include, for example, storing information to assist in debugging the problem in memory 142 and/or in long-term storage (such as a hard disk drive (HDD), solid state drive (SSD), flash memory, etc.). The recorded information may include, for example, the selected arrangement that was being executed when the problem occurred, the threads that were mapped to which CPU cores, clock rates of the CPU cores, the threads that were being executed at the time of the problem, the number of arrangements that had been tested successfully prior to the problem, etc.

In some embodiments, method 200 may further include interrupting execution 212. For example, if a problem is detected, further test operations may be suspended and information pertaining to the problem(s) may be output 216. Block 216 may include, for example, causing display of the information on one or more displays, causing one or more speakers to emit sound based on the information, sending the problem information to another application, saving the information (such as to long-term storage), etc. In some embodiments, method 200 only includes triggering an interrupt 212 based on certain conditions such as, for example, a total number of problems (e.g., an interrupt may be triggered if 10 or more total problems have been detected), a particular type of problem (e.g., errors fatal to execution of the application may result in an interrupt, while problems that are not fatal may not trigger an interrupt), etc.

The interrupt trigger 212 is optional; in some embodiments, rather than triggering an interrupt 212 after recording a problem 210, method 200 proceeds to determining whether all desired arrangements have been tested 214. In addition, if no problem is detected (208 "No"), method 200 further includes determining whether all desired arrangements have been tested 214. This may include, for example, determining whether an array of tested arrangements includes all arrangements determined at block 202. In some embodiments, this may include determining if a desired number of arrangements have been tested (e.g., 100 or more arrangements, 1000 or more arrangements, etc.), which, depending upon embodiment, may be achieved simply by determining a size (or similar property) of an array. If not all desired arrangements have been tested (214 "No"), then another untested arrangement is selected 204. As described above, this may include determining whether a newly selected arrangement has already been tested, and/or may include determining a random arrangement.

If all desired arrangements have been tested (214 "Yes"), method 200 further includes outputting results 216. As described above, block 216 may include, for example, causing display of the information on one or more displays, causing one or more speakers to emit sound based on the information, sending the problem information to another application, saving the information (such as to long-term storage), etc. Once results are output, method 200 ends 220.

Figure 3:
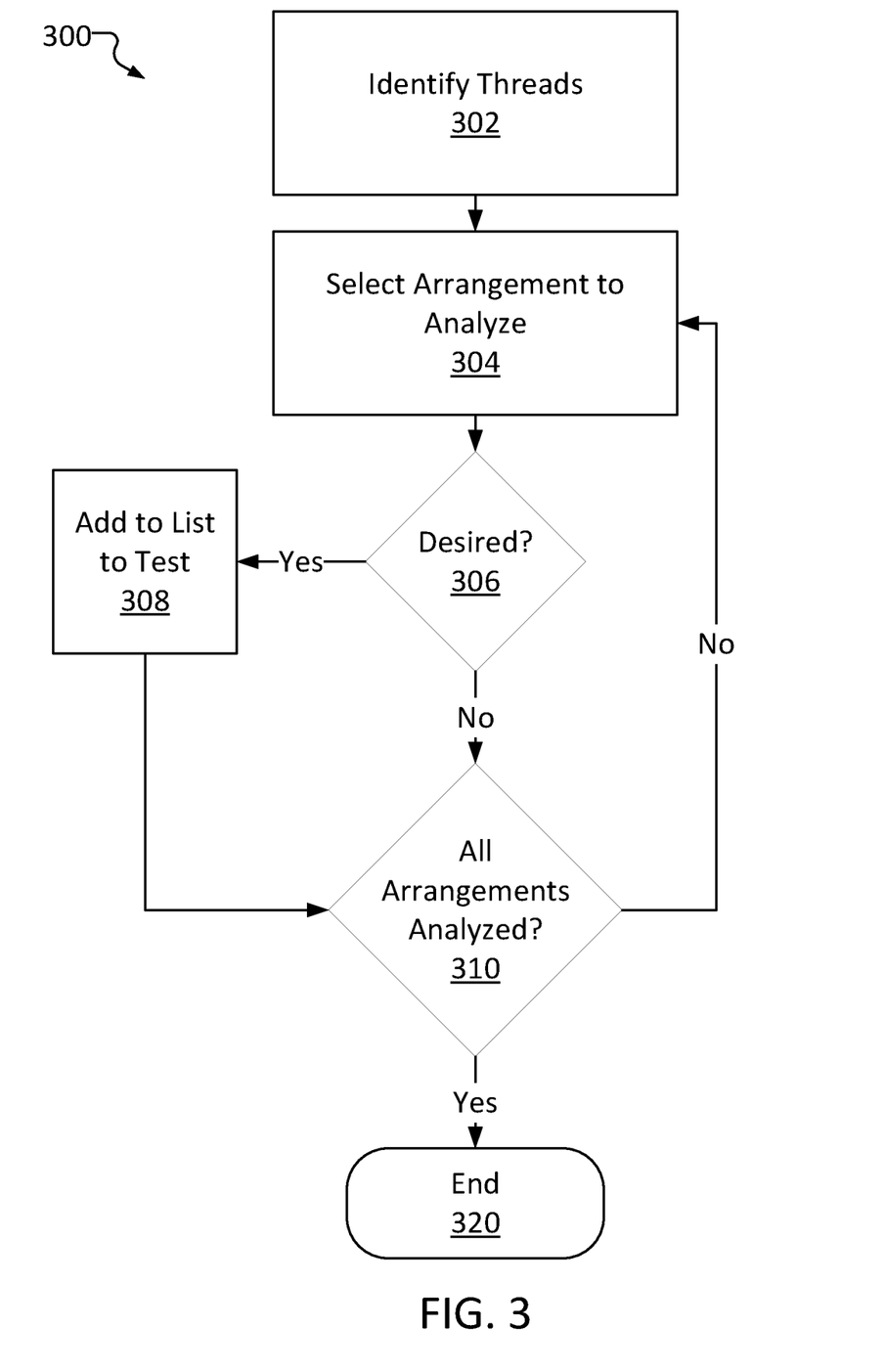
FIG. 3 illustrates a method of determining which permutations of thread-core mappings to test according to an embodiment of the present disclosure.

FIG. 3 illustrates a method 300 of determining which arrangements of thread-core mappings to test according to an embodiment of the present disclosure. Method 300 may be performed by, for example, system 100. Method 300 include identifying threads of an application 302. This may include, for example, determining how many threads a particular application to be tested includes. Block 302 may further include identifying the threads, either by an application specific identifier or by determining a new identifier (for example, if an application has three threads, this may include identifying the threads as thread A, thread B, and thread C, and so on for applications with more than three threads). This may enable system 100 to keep track of which threads are which, thus reducing execution of redundant arrangements.

Method 300 further includes selecting an arrangement to analyze 304. This may include selecting one from a plurality of permutations of thread execution orders. Block 304 may further include steps to ensure that the arrangement selected has not already been analyzed, analogous to selecting an "untested" arrangement 204 of FIG. 2 (i.e., keeping an array of analyzed arrangements, adding to the array as each arrangement is analyzed, and checking each newly selected arrangement against the array to ensure that the selected arrangement has not already been analyzed). However, as used herein, "analyze" is distinct from "test" or "execute." While "testing" an arrangement, as described herein, refers to executing an application by scheduling the threads of the application to execute on specified cores according to the arrangement, "analyzing" an arrangement, as used herein, refers to a system such as system 100 determining whether testing the arrangement is desirable 306. This may include, for example, determining whether the arrangement is redundant with a previously identified arrangement. In some embodiments, determining whether an arrangement is desirable includes determining whether the threads of an application such as application 148 could possibly execute in an order dictated by the arrangement.

For example, in execution of an application, some applications may be structured such that some threads may not begin execution until after one or more other "precursor" or "parent" threads have completed. Thus, an arrangement requiring execution of a thread before or alongside a "precursor" or "parent" thread cannot possibly be implemented, and therefore attempting to test such an arrangement may be a waste of time and resources. This may be particularly problematic if, for example, the threads in question would be executed near the end of execution of the application; if execution of thread N cannot, in practice, be initiated until after thread N−1 has been completed, then a first arrangement dictating that thread N should be scheduled to execute on core 0 while thread N−1 executes on core 1 cannot be tested. Thus, in attempting to test such an arrangement, a system such as system 100 would spend time and computing resources executing threads A through N−2 according to the arrangement before encountering conditions that cannot be met. Further, a second arrangement dictating that thread N should be scheduled to execute on core 1 while thread N−1 executes on core 0 also cannot be tested, and so on for each possible mapping having thread N and thread N−1 execute simultaneously. Thus, by determining beforehand that these arrangements are not actually possible (e.g., via method 300) and omitting testing of impossible arrangements, valuable time and computing resources may be saved.

If an arrangement is determined to be desirable (306 "Yes"), then the arrangement may be added to a list for testing 308. This may include adding the arrangement to an array or similar data structure stored in memory such as memory 142 or on long-term storage. If the arrangement is determined to not be desired (306 "No"), then the arrangement is discounted (for example, the arrangement may not be added to the array). In some embodiments, method 300 may further include, responsive to a determination of 306 "No," adding the undesired arrangement to a distinct "blacklist" array. In some embodiments, both the array of arrangements to be tested and such a "blacklist" array may be the same array, and arrangements may be distinguished as desired, possible, redundant, etc. or not via, for example, one or more indicator bits.

Method 300 further includes determining whether all arrangements have been analyzed 310. This may include, for example, determining whether every potential arrangement (i.e., every permutation of thread-core execution mappings) has been analyzed and determined to be impossible or possible. In some embodiments, system 100 may default to assuming an arrangement is possible unless a specific structure of the application indicates the arrangement would not be possible. If not all arrangements have been analyzed (310 "No"), an additional arrangement is selected 304 and analyzed. Once all arrangements have been analyzed (310 "Yes"), method 300 ends 320. In some embodiments, method 300 may comprise one method to determine test parameters, analogous to block 202 of method 200 with reference to FIG. 2.

In some embodiments, rather than mapping threads to specific cores or speeds, arrangements may dictate a "category" of cores or speeds for a particular thread. For example, an arrangement may determine that thread A is to be executed on "slow" cores, while thread B is to be executed on "medium" cores or "fast" cores. Definitions of categories such as "slow" or "medium" may vary based on embodiment. For example, in some embodiments, "slow" may refer to a threshold frequency (for example, "any core that is operating at 1 GHz or less"), a frequency relative to a maximum frequency (for example, "any core that is operating at 20% of maximum frequency or less"), a frequency relative to other cores (for example, "any core that is not operating faster than all other cores"). Categories may also be restricted to specific cores; for example, a "slow" core may be defined as "either core 1 or core 2," or "the slowest of cores 0-3," etc. In some embodiments, a thread assigned to a specific category may be scheduled to be executed on the Combinations are possible as well; in some embodiments, an arrangement may dictate that thread A is to be executed on a "fast" core while thread B is to be executed on "either core 1 or core 2." In some embodiments, categories and their definitions may be fixed. In some embodiments, categories and/or their definitions may vary depending upon arrangement.

In some embodiments, threads may be grouped into classes. For example, thread A may be a first type of thread, and an arrangement may dictate that all threads of the first type are to be executed on "slow" cores. In the same example, when thread A is to be executed, thread A may be scheduled to be executed on a slow core based on the arrangement and the class that thread A belongs to. This may reduce the number of arrangements to test.

A cloud computing environment is service oriented with a focus on statelessness, low coupling, modularity, and semantic interoperability. At the heart of cloud computing is an infrastructure that includes a network of interconnected nodes.

Figure 4:
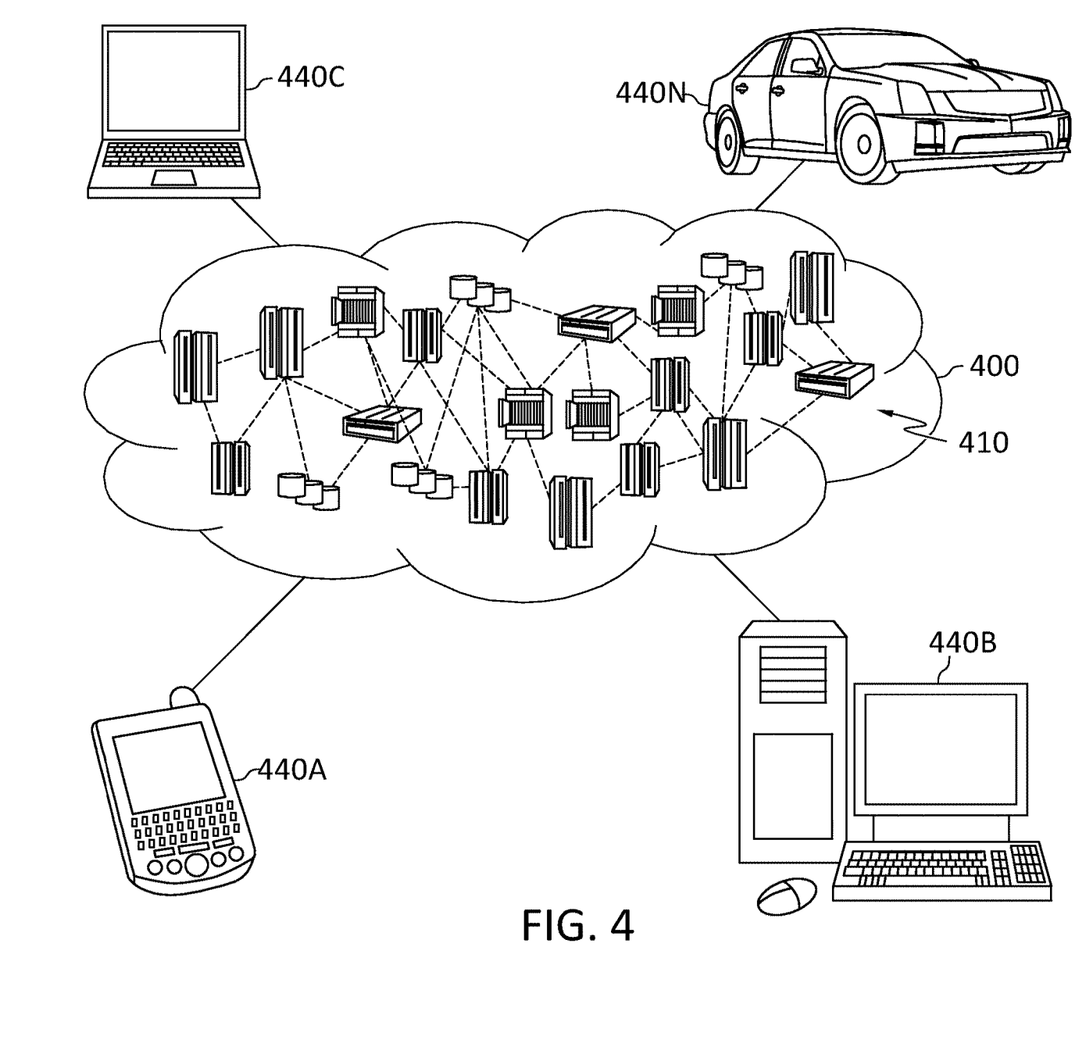
FIG. 4 depicts a cloud computing environment according to an embodiment of the present disclosure.

Referring now to FIG. 4, illustrative cloud computing environment 400 is depicted. As shown, cloud computing environment 400 comprises one or more cloud computing nodes 410 with which local computing devices used by cloud consumers, such as, for example, personal digital assistant (PDA) or cellular telephone 440A, desktop computer 440B, laptop computer 440C, and/or automobile computer system 440N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440A-N shown in FIG. 4 are intended to be illustrative only and that computing nodes 410 and cloud computing environment 400 can communicate with any type of computerized device over any type of network and/or network addressable connection (e.g., using a web browser).

Figure 5:
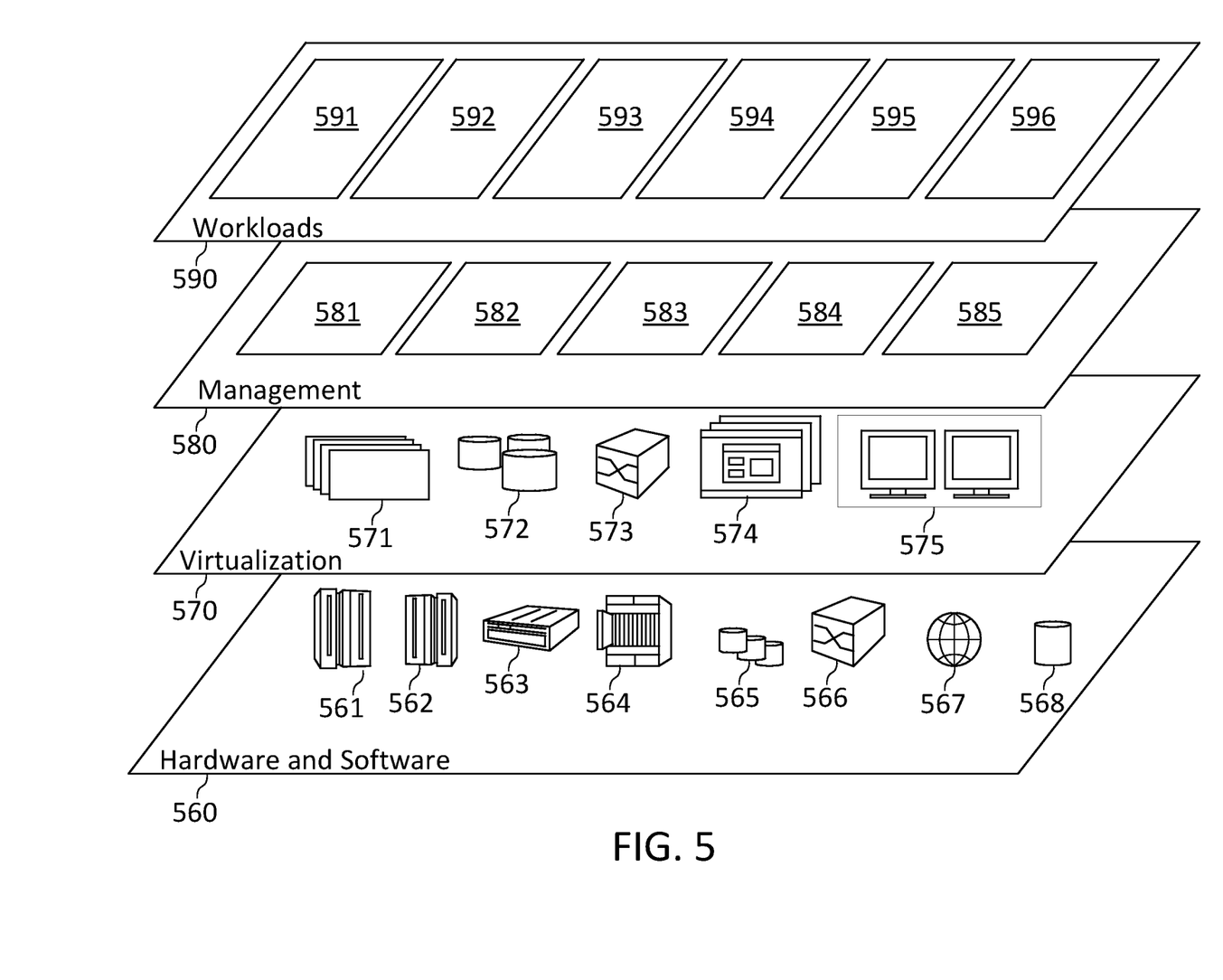
FIG. 5 depicts abstraction model layers according to an embodiment of the present disclosure.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and media selection based on content topic and sentiment 596.

Figure 6:
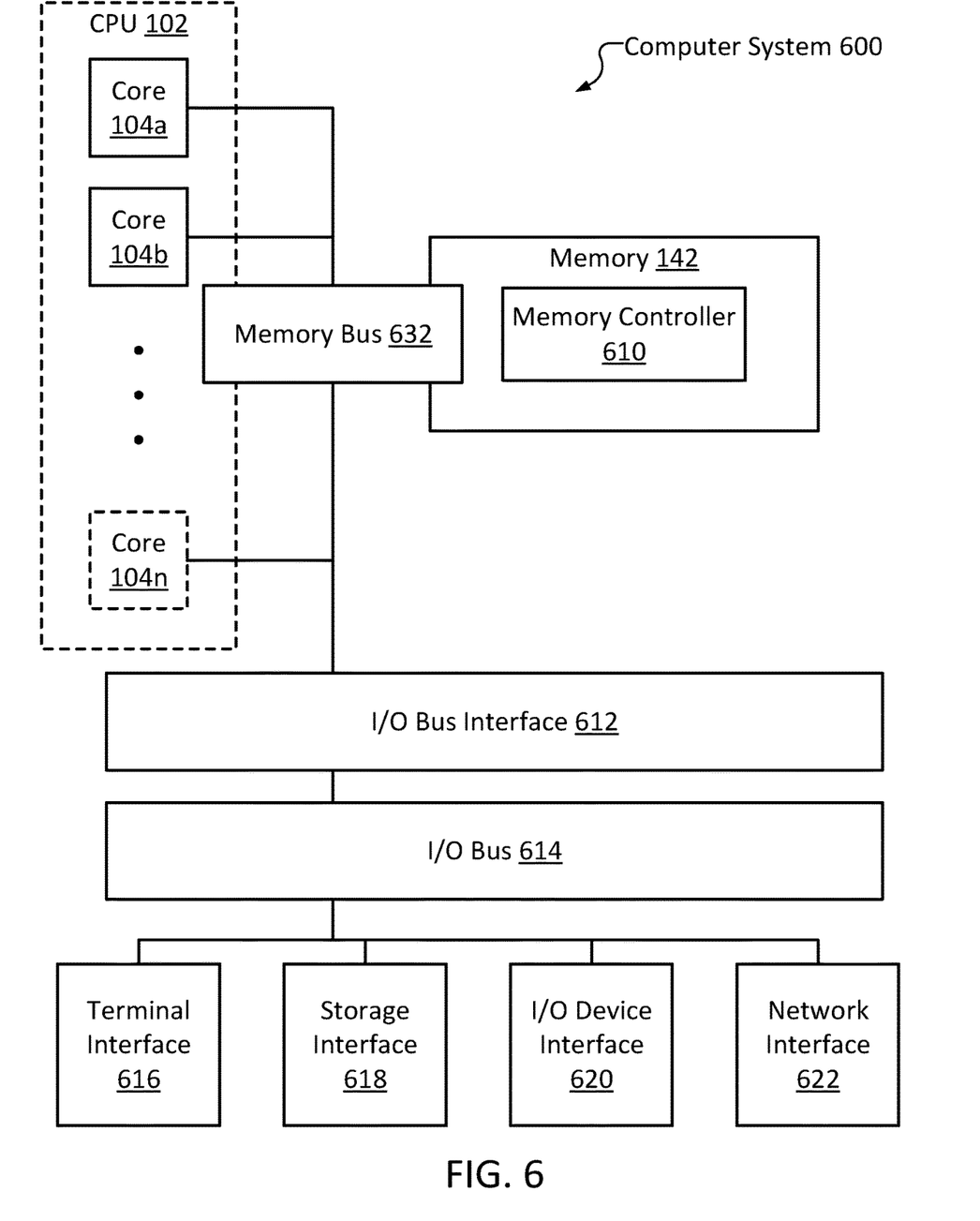
FIG. 6 illustrates a high-level block diagram of an example computer system that may be used in implementing embodiments of the present disclosure.

Referring now to FIG. 6, shown is a high-level block diagram of an example computer system 600 that may be configured to perform various aspects of the present disclosure, including, for example, methods 200 and 300. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise a CPU 102 with one or more CPU cores 604, a memory subsystem 142, a terminal interface 616, a storage interface 618, an I/O (Input/Output) device interface 620, and a network interface 622, all of which may be communicatively coupled, directly or indirectly, for inter-component communication via a memory bus 632, an I/O bus 614, and an I/O bus interface unit 612.

The computer system 600 may contain one or more general-purpose programmable central processing units (CPUs) 102, some or all of which may include one or more cores 104a, 104b, and 104n, herein generically referred to as the CPU 602. In some embodiments, the computer system 600 may contain multiple processors typical of a relatively large system; however, in other embodiments the computer system 600 may alternatively be a single CPU system. Each CPU 102 may execute instructions stored in the memory subsystem 142 on a CPU core 104 and may comprise one or more levels of on-board cache.

In some embodiments, the memory subsystem 142 may comprise a random-access semiconductor memory, storage device, or storage medium (either volatile or non-volatile) for storing data and programs. In some embodiments, the memory subsystem 142 may represent the entire virtual memory of the computer system 600 and may also include the virtual memory of other computer systems coupled to the computer system 600 or connected via a network. The memory subsystem 142 may be conceptually a single monolithic entity, but, in some embodiments, the memory subsystem 142 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 142 may contain elements for control and flow of memory used by the CPU 102. This may include a memory controller 610.

Although the memory bus 632 is shown in FIG. 6 as a single bus structure providing a direct communication path among the CPU 102, the memory subsystem 142, and the I/O bus interface 612, the memory bus 632 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   determining a first arrangement, the first arrangement dictating a first set of execution speeds for a plurality of threads to cause a first thread to execute before a second thread;
   selecting, for at least the first thread, a first CPU core based on:
      a first clock rate of the first CPU core; and
      a first execution speed of the first thread, the first execution speed dictated by the first arrangement;
   causing the first CPU core to execute the first thread based on the first execution speed;
   determining a second arrangement, the second arrangement dictating a second set of execution speeds for the plurality of threads to cause the second thread to execute before the first thread;
   selecting, for at least the first thread, a second CPU core based on:
      a second clock rate of the second CPU core; and
      a second execution speed of the second thread, the second execution speed dictated by the second arrangement; and
   causing the second CPU core to execute the first thread based on the second execution speed.

2. The method of claim 1, wherein determining the first arrangement comprises:
   selecting at least one of a plurality of potential arrangements; and
   determining whether the selected arrangement is desirable.

3. The method of claim 1, further comprising:
   determining a third arrangement, the third arrangement dictating a third set of execution speeds for the plurality of threads;
   selecting, for at least the first thread, a third CPU core based on:
      a third clock rate of the third CPU core; and
      a third execution speed of the second thread, the third execution speed dictated by the third arrangement; and
   causing the third CPU core to execute the first thread based on the third execution speed.

4. The method of claim 3, further comprising adjusting the third clock rate of the first CPU core based at least on the third execution speed.

5. The method of claim 1, further comprising:
   determining whether executing the first thread results in a problem; and
   responsive to a determination that executing the first thread results in a problem, outputting the problem.

6. The method of claim 3, wherein selecting the third CPU core comprises enabling a user to select the third CPU core.

7. The method of claim 1, wherein the first arrangement identifies a desired clock rate at which the first thread is to be executed; and
   the causing execution includes:
      selecting, for at least the first thread based on the desired clock rate, a first CPU core; and
      causing the first CPU core to execute the first thread.

8. The method of claim 1, wherein the first arrangement further dictates an order of execution for the plurality of threads.

9. A system comprising:
   a memory; and
   a central processing unit (CPU) including a plurality of CPU cores configured to:
      determine a first arrangement, the first arrangement dictating a first set of execution speeds for a plurality of threads to cause a first thread to execute before a second thread;
      select, for at least the first thread, a first CPU core based on:
         a first clock rate of the first CPU core; and
         a first execution speed of the first thread, the first execution speed dictated by the first arrangement;
      cause the first CPU core to execute the first thread based on the first execution speed;
      determine a second arrangement, the second arrangement dictating a second set of execution speeds for the plurality of threads to cause the second thread to execute before the first thread;
      select, for at least the first thread, a second CPU core based on:
         a second clock rate of the second CPU core; and
         a second execution speed of the second thread, the second execution speed dictated by the second arrangement; and
      cause the second CPU core to execute the first thread based on the second execution speed.

10. The system of claim 9, wherein determining the first arrangement comprises:
    selecting at least one of a plurality of potential arrangements; and
    determining whether the selected arrangement is desirable.

11. The system of claim 9, wherein the processor is further configured to:
    determine a third arrangement, the third arrangement identifying a third set of execution speeds for the plurality of threads;
    select, for at least the first thread, a third CPU core based on:
       a third clock rate of the third CPU core; and
       a third execution speed of the second thread, the third execution speed dictated by the third arrangement; and
    cause the third CPU core to execute the first thread based on the third execution speed.

12. The system of claim 11, wherein the processor is further configured to adjust the third clock rate of the first CPU core based at least on the third execution speed.

13. The system of claim 9, wherein the CPU is further configured to:
    determine whether executing the first thread results in a problem; and
    responsive to a determination that executing the first thread results in a problem, output the problem.

14. The system of claim 11, wherein selecting the third CPU core comprises enabling a user to select the third CPU core.

15. The system of claim 9, wherein:
    the first arrangement identifies a desired clock rate at which the first thread is to be executed; and
    the causing execution includes:
       selecting, for at least the first thread based on the desired clock rate, a first CPU core; and
       cause the first CPU core to execute the first thread.

16. The system of claim 9, wherein the first arrangement further dictates an order of execution for the plurality of threads.

17. A computer program product, the computer program product comprising a computer readable storage medium having program instructions embodied therewith, the program instructions executable by a computer to cause the computer to:

determine a first arrangement, the first arrangement dictating a first set of execution speeds for a plurality of threads to cause a first thread to execute before a second thread;

elect, for at least the first thread, a first CPU core based on:
        a first clock rate of the first CPU core; and
        a first execution speed of the first thread, the first execution speed dictated by the first arrangement;

cause the first CPU core to execute the first thread based on the first execution speed;

determine a second arrangement, the second arrangement dictating a second set of execution speeds for the plurality of threads to cause the second thread to execute before the first thread;

select, for at least the first thread, a second CPU core based on:
        a second clock rate of the second CPU core; and
        a second execution speed of the second thread, the second execution speed dictated by the second arrangement; and     cause the second CPU core to execute the first thread based on the second execution speed.

18. The computer program product of claim 17, wherein the instructions further cause the computer to:

determine a third arrangement, the third arrangement identifying a third set of execution speeds for the plurality of threads;

select, for at least the first thread, a third CPU core based on:
        a third clock rate of the third CPU core; and
        a third execution speed of the second thread, the third execution speed dictated by the third arrangement; and     cause the third CPU core to execute the first thread based on the third execution speed.

19. The computer program product of claim 18, wherein the instructions further cause the computer to adjust the third clock rate of the third CPU core based at least on the first execution speed.

20. The computer program product of claim 17, wherein the instructions further cause the computer to, for at least the first arrangement:

determine whether executing the first thread results in a problem; and     responsive to a determination that executing the first threads results in a problem, output the problem.

* * * * *